United States Patent
Salvador et al.

(10) Patent No.: US 9,072,038 B2
(45) Date of Patent: Jun. 30, 2015

(54) USER EQUIPMENT SIGNALING TRAFFIC REDUCTION

(75) Inventors: Omar Salvador, Wheaton, IL (US); Dirk Neuberger, Hackensack, NJ (US); Jin Wang, Lisle, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 831 days.

(21) Appl. No.: 13/303,665

(22) Filed: Nov. 23, 2011

(65) Prior Publication Data

US 2013/0130693 A1 May 23, 2013

(51) Int. Cl.
- H04W 36/00 (2009.01)
- H04W 4/00 (2009.01)
- H04W 48/20 (2009.01)
- H04W 76/06 (2009.01)
- H04W 76/04 (2009.01)
- H04W 48/06 (2009.01)

(52) U.S. Cl.
CPC ............ *H04W 48/20* (2013.01); *H04W 76/046* (2013.01); *H04W 76/048* (2013.01); *H04W 76/066* (2013.01); *H04W 48/06* (2013.01)

(58) Field of Classification Search
CPC ... H04W 48/06; H04W 48/00; H04W 76/048; H04W 28/08; H04W 36/00; H04W 36/14
USPC .............. 455/437, 436, 453, 435.3, 512, 527, 455/166.2, 435.1; 370/331, 395.42, 444, 370/455
See application file for complete search history.

(56) References Cited

U.S. PATENT DOCUMENTS

| | | | |
|---|---|---|---|
| 2009/0077231 A1* | 3/2009 | Sakai et al. | 709/224 |
| 2010/0304745 A1* | 12/2010 | Patel et al. | 455/435.1 |
| 2010/0317345 A1 | 12/2010 | Futaki et al. | |
| 2010/0318641 A1* | 12/2010 | Bullard et al. | 709/223 |
| 2012/0307669 A1* | 12/2012 | Kim et al. | 370/252 |
| 2014/0362717 A1* | 12/2014 | Koskinen et al. | 370/252 |

FOREIGN PATENT DOCUMENTS

| | | |
|---|---|---|
| EP | 2120479 | 11/2009 |
| EP | 2157830 | 2/2010 |
| JP | 2010050969 | 3/2010 |
| JP | 2011166838 | 8/2011 |
| WO | 2008096685 | 8/2008 |
| WO | 2011/085238 | 7/2011 |

* cited by examiner

*Primary Examiner* — Michael Mapa
(74) *Attorney, Agent, or Firm* — Patti & Malvone Law Group, LLC

(57) ABSTRACT

A method in one example comprises receiving a measurement report for a handover at a source evolved Node B (eNodeB) of a Long Term Evolution (LTE) communication network. The measurement report is received from a user equipment (UE) served by the source eNodeB. A determination is made whether the UE is dormant. A determination is made whether a current load level for the handover is over a threshold. The measurement report is discarded if the current load level is over the threshold and the UE is dormant. The handover is triggered based on the measurement report if the current load level is not over the threshold or the UE is not dormant.

20 Claims, 8 Drawing Sheets

USER EQUIPMENT SIGNALING TRAFFIC REDUCTION

BACKGROUND

In a long term evolution (LTE) wireless communication network, user equipment (UE), such as mobile phones or other wireless-enabled devices, intermittently exchange user data with an evolved Node B (eNodeB). The data may include voice over IP (VoIP), multimedia, Internet traffic, or other content and may be transmitted toward the network as uplink (UL) data or received from the network as downlink (DL) data.

From a management perspective, the UE is in one of three states: Detached, Idle, or Connected. When the UE is first turned on, it is in the detached state and does not have designated network resources available for data exchange. Upon registration with the network, the UE enters the connected state and has a radio resource control (RRC) connection with the eNodeB allowing data transfer. After an inactivity period where no user data is exchanged, the UE may enter an idle state to conserve network resources and UE battery life. The UE may re-enter the connected state from the idle state when new data transfer is imminent.

The maximum number of UEs that can be supported by an eNodeB is finite. When the limit is about to be reached, some UEs may be transitioned to the idle state via radio resource control (RRC) connection release to give room for new calls and incoming handover (HO) requests. UEs selected for RRC release can be those that are "dormant" and have not been using UL and DL bearer services for some time. Released UEs remain attached to the network and may trigger a new RRC connection request when bearer traffic starts.

Although non-revenue-generating, these transitions of Connected to Idle contribute to the signaling load to be processed by various network elements. Frequent transitions of UE states from Connected to Idle (RRC release and S1Release) and from Idle back to Connected (Service Requests) can significantly impact capacity and performance of the eNodeB and evolved packet core (EPC). In addition, once UEs are in the Idle state, network originated Service Requests require paging which will increase signaling traffic, increase usage of radio frequency (RF) resources, and lengthen delays for UEs configured with longer paging cycle (up to 2.5 seconds) to monitor the paging channel.

With the introduction of new applications and devices, it can be very difficult to predict the amount of signaling traffic load that each Network Element (eNodeB/EPC) needs to support. This presents a challenge for operators since deployment of new devices or applications can cause congestion and overload conditions in the network. This may require re-engineering of the network and deployment of additional nodes (which can take several months).

SUMMARY

The invention in one implementation encompasses a method. A measurement report for a handover is received at a source evolved Node B (eNodeB) of a Long Term Evolution (LTE) communication network from a user equipment (UE) served by the source eNodeB. A determination is made whether the UE is dormant. A determination is made whether a current load level for the handover is over a threshold. The measurement report is discarded if the current load level is over the threshold and the UE is dormant. The handover is triggered based on the measurement report if the current load level is not over the threshold or the UE is not dormant.

Another implementation of the invention encompasses another method. A request for a handover of a UE is received from a source eNodeB of an LTE communication network. A determination is made whether a current load level for the handover is over a load threshold. The request is accepted if the current load level is not over the load threshold. A determination is made whether an inactivity time for the UE is over a predetermined inactivity threshold. The handover is rejected if the inactivity time is over the predetermined inactivity threshold.

A further implementation of the invention encompasses an apparatus. The apparatus comprises an evolved Node B (eNodeB) of a Long Term Evolution (LTE) communications network. The eNodeB is configured to release at least one UE served by the eNodeB if a current load level of the eNodeB is over a load threshold. The eNodeB is further configured to release at least one UE served by the eNodeB if the eNodeB has reached a connected user threshold. The eNodeB is configured to increase a release inactivity timer for at least one UE if the current load level is not over the load threshold and the eNodeB has not reached a connected user threshold.

DESCRIPTION OF THE DRAWINGS

Features of example implementations of the invention will become apparent from the description, the claims, and the accompanying drawings in which:

DETAILED DESCRIPTION

Figure 1:
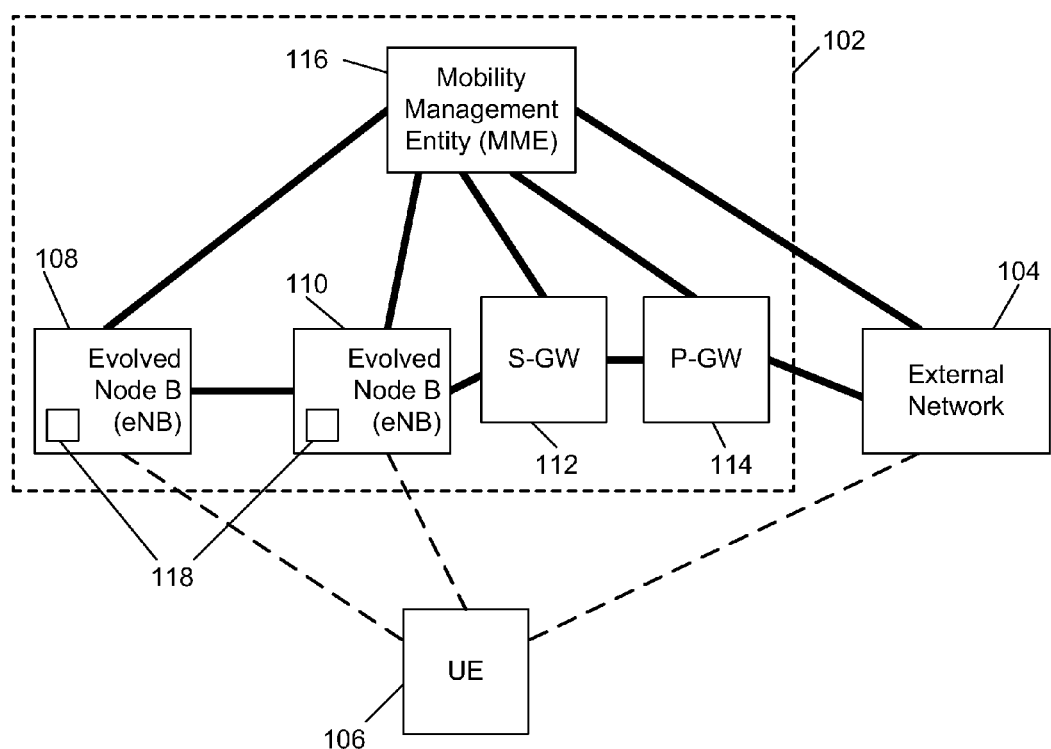
FIG. 1 is a representation of one implementation of a system that comprises an external network and a long term evolution (LTE) network, with at least one evolved Node B (eNodeB), a mobility management entity (MME), a gateway, and a user equipment.

Medium Access Control Discontinuous Reception (MAC-DRX) support in user equipment (UE) and evolved Node Bs (eNodeBs) is introduced by the standards (3GPP TS 36.321 and TS 36.331), which helps to address some of the problems of signaling load. UEs configured with MAC-DRX by the eNodeB will enter a MAC-DRX cycle after the last scheduling of UL or DL data. A MAC-DRX inactivity timer acts as a countdown timer to determine whether to enter the DRX cycle and become dormant. The eNodeB resources allocated to these dormant MAC-DRX UEs can then be re-allocated to other UEs with UL or DL bearer traffic or to newly connected UEs and incoming handover UEs. This allows for an increase in the maximum number of connected UEs supported by the eNodeB, e.g. from 500 per eNodeB to 2,000 per eNodeB, even though the number of UEs using UL or DL bearer services may remain about the same.

UEs that employ MAC-DRX cycles will have a longer connection duration, which will increase the frequency of handover (HO) events per UE. These additional HO events increase the use of processing resources on both the eNodeB and the UE. For example, extra processing on the UE will consume more battery power and extra processing on the eNodeB can impact handovers of connected UEs with uplink (UL) or downlink (DL) traffic as well as new calls that are revenue generating.

Current 3GPP standard procedures require that the eNodeB triggers the release of RRC Connected UEs, through radio resource control (RRC) and S1 releases, based on user inactivity under normal conditions. The user inactivity is based on a pre-configured "release inactivity timer" in the eNodeB. If MAC-DRX is not enabled, the release inactivity timer is set to a relatively low value in order to conserve UE battery life (e.g., around 10 sec). With a low release inactivity timer, it has been observed that, depending on the UE type, approximately 10-50 idle to connected transitions are triggered during a "Busy Hour" period of high network traffic. This results in a significant signaling load on the network.

With MAC-DRX enabled, an increased release inactivity timer has a smaller impact on UE battery life. A larger release inactivity timer reduces the number of connection attempts (e.g., idle to connected transitions) but also increases the number of handover events associated with dormant UEs. It is beneficial to manage these extra handover events triggered by the dormant UEs in order to minimize the impact on the UE battery and on the eNodeB load. Also, a single release inactivity timer may not be "tuned" properly for the different types of UEs and associated traffics (e.g., smartphones/tablets run different applications compared to machine-to-machine devices). One goal is to reduce the overall signaling load on the network with minimal impact on the UE's battery life.

Support enhancements in the eNodeB are proposed in order to reduce blocking of idle-to-RRC-Connection transitions and to reduce control plane signaling events on the evolved packet core (EPC) and eNodeB, and to reduce latencies inherent to transitions from idle to RRC connected state. In one implementation where MAC-DRX is supported, the UE will be kept in the RRC Connected state for a longer period of time by increasing the release inactivity timer. The timer may be increased to substantially above 10 seconds.

In a first example, a single "static" release inactivity timer value is provisioned by the service provider for all UE types. Values for the release inactivity timer value include, but are not limited to, values between two and 100 seconds. In a second example, the release inactivity timer value can be dynamically set based on one or more factors, such as device type, network load, or user priority. Additional factors will be apparent to those skilled in the art. For example, different release inactivity timer values may be used for smartphones and machine-to-machine devices. For the latter, additional enhancements are performed in the mobility management entity (MME) so that the release inactivity timer can be specified per individual UE during the attach procedure.

In order to reduce signaling, such as outgoing HO events of dormant UEs, HO measurement reports from UEs in MAC-DRX mode may be discarded or ignored by the eNodeB, as described herein. In the case that no Event A2 measurement has been set up with the UEs by the eNodeB (e.g., in a non-border cell that is away from the external network 104) and the source cell is in overload, the handover measurement reports from the UE may be handled by the eNodeB with an RRC Connection Release. In one example, the report is ignored if the source eNodeB load is above a load threshold or if the target cell load is above a load threshold. Advantageously, this reduces signaling load in the network (eNodeB and EPC) and avoids worsening an overload situation for processing events that are non-revenue generating.

Suppressing certain HO activities, such as the reports, for a dormant UE can be done without significantly impacting the overall service performance due to several factors. A first factor is that an intra-frequency HO measurement trigger typically uses an Event A3 report that indicates the target cell's signal quality is better than source cell by an offset. In urban area deployment where overlapping of LTE coverage can be substantial, Event A3 measurement reports from UEs do not necessarily imply that an imminent Radio Link Failure (RLF) will occur if the UE report for HO is discarded.

As a second factor, the eNodeB may also configure Event A2 with the UE, where a UE report is triggered when the source cell's signal quality is below a threshold, to monitor whether RLF is about to occur. After sending the Event A3 report and prior to sending the Event A2 report, some UEs may see an improvement in signal quality because they are moving back into a good coverage area. Alternatively, some UEs may experience no further RF degradation. Discarding Event A3 reports do not impact these UEs.

A third factor is that a UE with a degrading RF signal is often moving away from the source cell. In the absence of a handover, the UE will send an Event A2 report which will be used to trigger an RRC release and S1 release of the UE. This puts the UE in the idle state and frees the network resources previously allocated to it.

In addition, the eNodeB may take into account several factors in order to keep the UE in the RRC Connected state. In one example, the eNodeB may release UEs when it reaches its maximum support limit of connected UEs (RRC_CONNECTED) to allow other UEs to be connected. The eNodeB can make a decision on which UEs to release based on certain criteria: such as a UE with the longest time spent in a dormant state, an excessive HO rate, the UE's type, or priority (if available).

In another example, the eNodeB can release UEs when a predetermined condition for the eNodeB is reached. For example, the eNodeB may be configured to release UEs when one or more thresholds for processor, memory, or other resources have been reached. The eNodeB can also decide to release UEs based on a recent handover rate of the UE or a dormancy timer indicating how long the UE has been in a dormant state. The handover rate and the dormancy timer can be based on configurable thresholds.

In one implementation, the eNodeB is configured to maintain a variable or parameter for the rate (or history) of handovers for a UE that are triggered between "local" cells and neighbor cells while the UE is in the dormant state. The eNodeB is configured to send the parameter over the X2 interface when performing a handover to another eNodeB, for example, contained within the handover request. This allows the eNodeBs to keep track of the number of handovers the UE makes while in the dormant state.

Turning to FIG. 1, a system 100 in one implementation comprises a long term evolution (LTE) communication network 102 configured to provide wireless communication services to at least one user equipment (UE) 106. The communication network 102 in one example comprises at least one eNodeB 108 and 110, a serving gateway (S-GW) 112, a packet data network gateway (P-GW) 114, and a mobile management entity (MME) 116. The eNodeBs 108 and 110 in one example comprise an instance of a recordable data storage medium 118, as described herein. The eNodeBs 108 and 110 in one example form an Evolved Universal Terrestrial Radio Access Network (E-UTRAN). The S-GW 112, P-GW 114, and MME 116 in one example form an Evolved Packet Core (EPC), as will be appreciated by those skilled in the art.

The eNodeBs 108 and 110 in one example act as base stations, or access points to the LTE communication network 102, to provide a communication link with the UE 106 over a radio interface. Features and functionality provided by the eNodeBs 108 and 110 include physical layer procedures for transmission and reception over the radio interface (e.g., modulation/demodulation, channel coding/decoding), radio resource control (RRC, related to allocation, modification, and release of resources for transmission over the radio interface) and radio mobility management (measurements and processing for handover decisions). Each eNodeB serves one or more cells, as will be appreciated by those skilled in the art.

The S-GW 112 in one example acts as a local mobility anchor for packet communications with the UE 106. The S-GW 112 provides a termination point to the E-UTRAN, allowing for the UE 106 to be handed off between the eNodeBs 108 and 110. The P-GW 114 in one example acts as an anchor point to external packet data networks (PDNs). The MME 116 provides subscriber and session management. Additional features and functionality of the eNodeBs 108 and 110, the S-GW 112, the P-GW, and the MME 116 will be apparent to those skilled in the art.

In another implementation, the system 100 further comprises one or more external networks 104. The external network 104 in one example comprises a wireless communication network with an alternate access technology such as Code Division Multiple Access (CDMA), Universal Mobile Telecommunications System (UMTS), or Global System for Mobile Communications (GSM). In another example, the external network 104 comprises a packet data network (PDN) such as the Internet.

As the UE 106 moves about a service coverage area provided by the LTE communication network 102 (e.g., the cells served by the eNodeBs), the UE 106 takes or performs various measurements for signal quality. The measurements may include one or more of intra-frequency measurements, inter-frequency measurements, and inter-radio access technology (inter-RAT) measurements. When a predetermined condition has been met, such as a change in signal quality that is associated with a handover, the UE sends a measurement report to the source eNodeB that manages the cell in which it is currently connected. Examples of the measurement reports include Events A1, A2, A3, A4, A5, B1, and B2, as described in 3GPP TS 36.331.

Upon receipt of the measurement report, the source eNodeB can determine whether to perform a handover with a target cell. The target cell may use the same frequency (intra-frequency handover), a different frequency (inter-frequency handover), or a different radio access technology (RAT, inter-RAT handover). The target cell may be served by the source eNodeB, another target eNodeB, or a base station within the external network 104 (e.g., wireless local area network access point, GPRS base station, UMTS base station, etc.).

Figure 2:
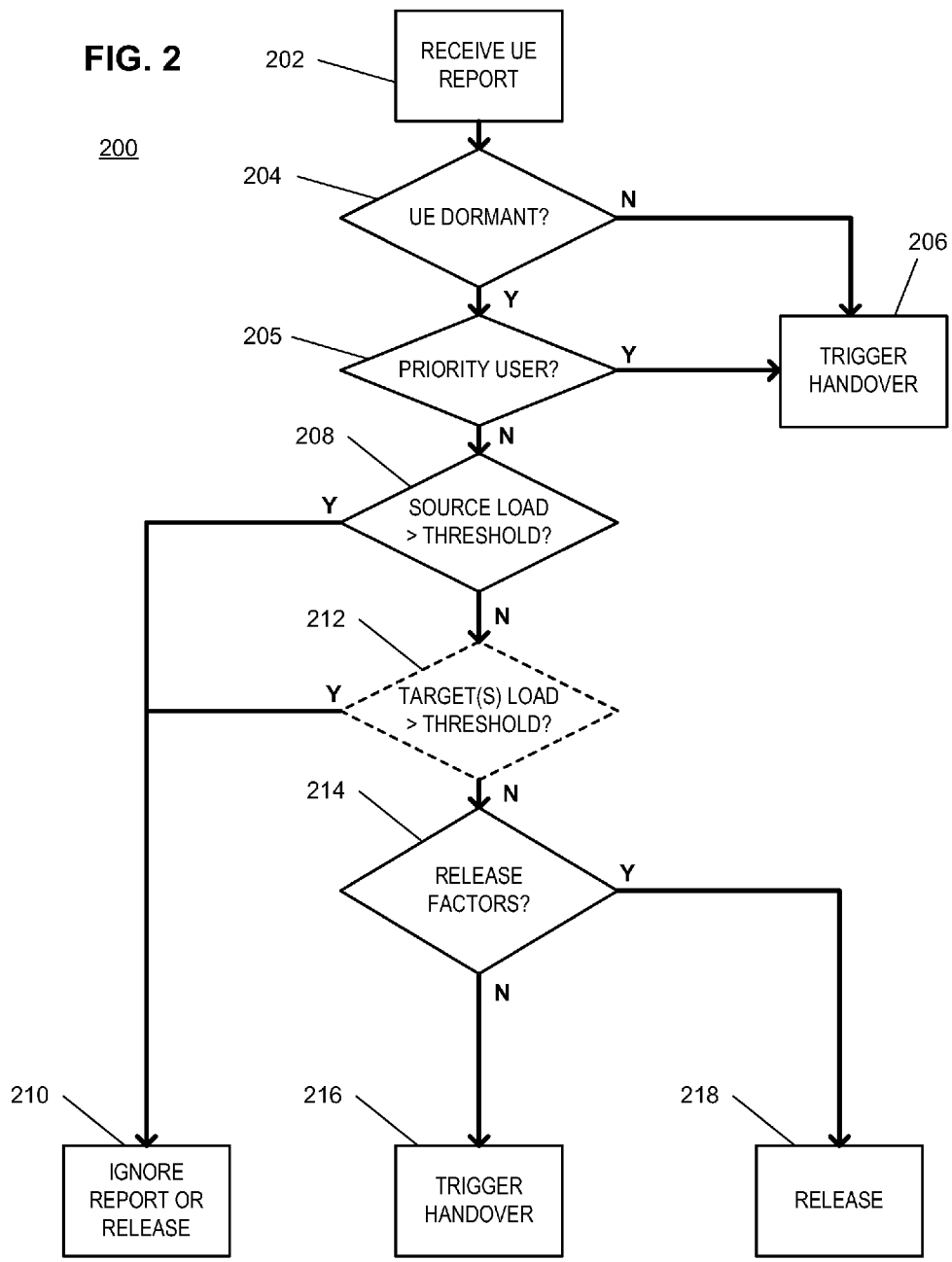
FIG. 2 is a representation of a logic flow for a source eNodeB illustrating receipt of a user equipment (UE) report for an intra-frequency handover in the system of FIG. 1.

Turning to FIG. 2, a logic flow 200 illustrates steps performed by a source eNodeB, for example, eNodeB 110, where the measurement report is an intra-frequency handover measurement report, such as an Event A3 report. Upon receipt (step 202) of the report, the eNodeB 110 determines (step 204) whether the UE 106 has been dormant. In one example, the eNodeB 110 considers the UE 106 to be dormant if it has not transferred user data within a predetermined amount of time, such as an inactivity time. The inactivity time in one example is reset upon sending or receiving user plane data. User plane data in one example is user plane traffic carried on traffic radio bearers (TRBs), which differs from signaling traffic (e.g., measurement reports) that is carried on signaling radio bearer (SRBs). User plane data include uplink (UL) or downlink (DL) user plane traffic. Other criteria for determining the presence of user activity and whether to reset the inactivity timer will be apparent to those skilled in the art.

If the UE 106 is not dormant, the eNodeB 110 triggers (step 206) the handover, for example, by sending a handover request to the eNodeB 108. If the UE 106 is currently dormant, the eNodeB 110 makes a determination (step 205) of whether the UE 106 (or the subscriber using it) is a "priority user." Examples of a priority user include those with a special access class, such as emergency services or network operators (as described in 3GPP TS22.011 Section 4), or subscribers with a high quality of service (QoS) level. Additional examples or factors for determining a priority user will be apparent to those skilled in the art. If the UE 106 is a priority user, the eNodeB 110 triggers the handover (step 206).

If the UE 106 is not a priority user, the eNodeB 110 compares its load level (step 208) with a predetermined load threshold or capacity threshold. The load level may be based on one or more factors, such as processor utilization, memory usage, radio resource allocation, or others, as will be appreciated by those skilled in the art. Values for the thresholds may be provisioned by the service provider to keep an eNodeB near its rated capacity, or some other operational point, as will be appreciated by those skilled in the art.

If the load of the eNodeB 110 is over the load threshold (e.g., in overload or at capacity), the eNodeB 110 in a first example ignores (step 210) or discards the report. In another example, the eNodeB 110 releases the UE 106 at step 210. As described above, the UE 106 may see an improvement in signal quality because of movement back into a good coverage area. The eNodeB 110 in one example is configured to ignore a predetermined number of reports (e.g., three reports) before finally releasing the UE 106. The predetermined number of reports may be provisioned by the service provider or dynamically determined, based on network conditions or other factors.

If the source eNodeB 110 is not overloaded, the eNodeB 110 may optionally make a determination (step 212) of whether the target cell is overloaded. Step 212 is optional because target cell information may be unavailable where the target cell is served by an eNodeB manufactured by a different vendor, conforms to a different standard, or is operated by a different service provider. In one example where the target cell is managed by the eNodeB 108, the eNodeBs 108 and 110 communicate over an X2 interface to provide the target cell load. In another example, the eNodeB 110 checks an overload flag or variable for the eNodeB 108 to determine its load status, as will be appreciated by those skilled in the art. If the target eNodeB 108 is overloaded, the eNodeB 110 may proceed to step 210, as described above. The source and target cells may be compared with a same load threshold for the determination, or compared with separate thresholds. The eNodeB 110 may also monitor several potential target cells and choose an alternate if the original target is in an overload condition. In one example, the measurement report from the UE 106 comprises additional target cells for handover consideration by the eNodeB 110 in step 212 if the first eNodeB is overloaded or otherwise rejects the handover.

If the source and target cells have sufficient capacity for the dormant UE 106, the eNodeB 110 then evaluates (step 214) one or more release factors to determine whether to trigger the handover (step 216) or to release (step 218) the UE 106. Examples of release factors include a handover rate and an inactivity time for the UE 106. For example, if the UE 106 has been performing a significant number of handovers while dormant and/or has not sent or received any data within a predetermined inactivity time (e.g., 3 seconds, 10 seconds, etc.), the eNodeB 110 may release (step 218) the UE 106. Additional release factors and their respective thresholds may be provisioned by the service provider and considered by the eNodeB 110. In a further example, the thresholds may be dynamically determined based on network conditions, user profiles, the type of UE (e.g., tablet or phone), or other factors. When the handover is performed, the eNodeB 110 sends a handover message to the target eNodeB and includes a parameter or variable for the handover frequency or history of the UE 106.

During intra-LTE handover, the source cell includes UE info in the handover message to the target cell. 3GPP standards already allow UE info to include UE inactivity time as measured by the source cell. If the source cell is not able to determine whether the target cell is in overload, it may attempt the handover. If the target cell is in overload, the target cell can make use of the UE inactivity time info from the source cell to determine whether the incoming HO request should be handled or rejected. For example, if the UE has been dormant or idle in the source cell for the last three seconds or longer, the target cell may decide to reject the incoming HO request if the target cell is already in overload. This helps trigger the source cell to select an alternate target cell for the handover. If it is less than three seconds, the target cell may accept the incoming HO.

Figure 3:
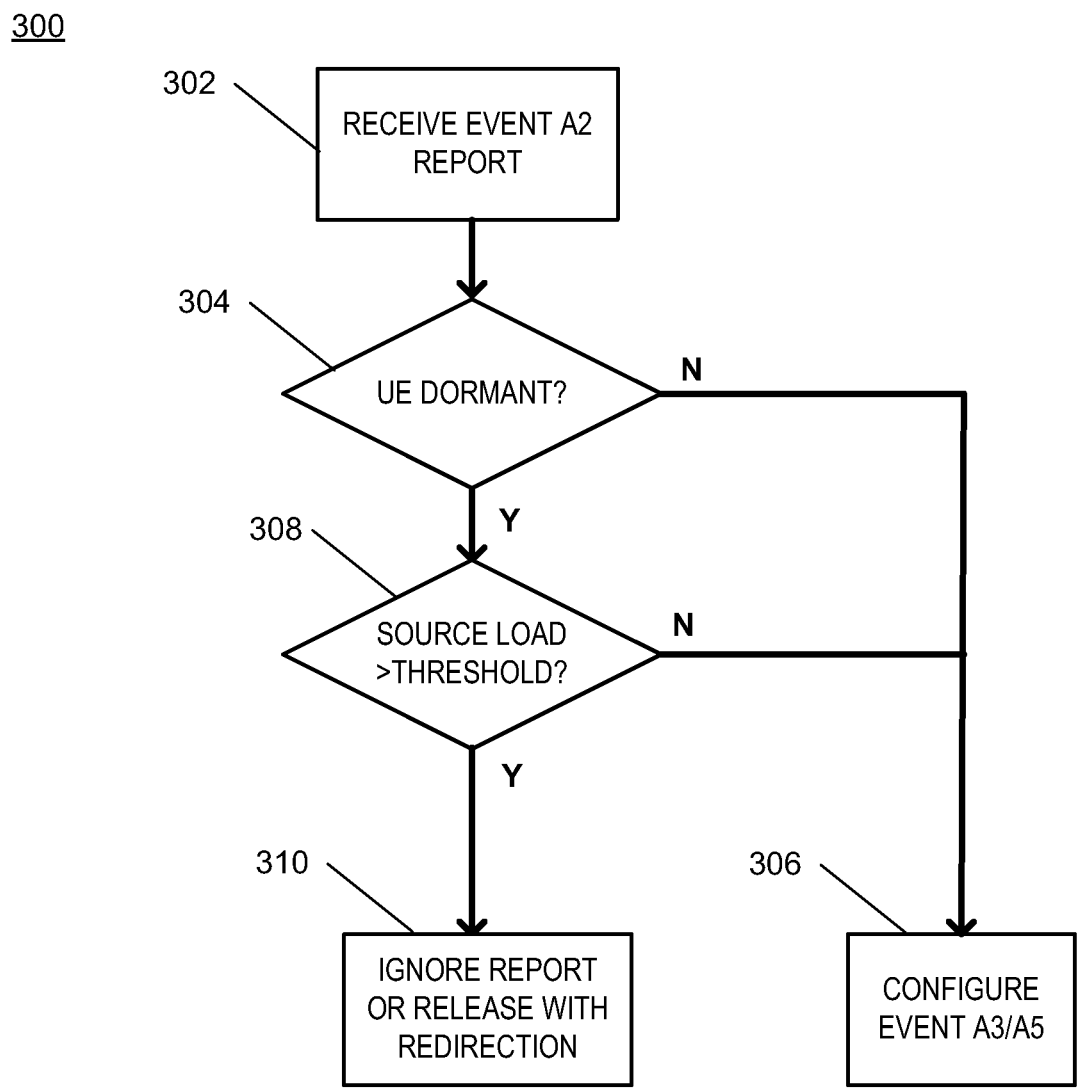
FIG. 3 is a representation of a logic flow for a source eNodeB illustrating receipt of a coverage alarm report for an inter-frequency handover in the system of FIG. 1.

Turning to FIG. 3, a logic flow 300 illustrates steps performed by the eNodeB 110 upon receipt of an inter-frequency handover measurement report. In one example, the eNodeB 110 receives an Event A2 "coverage alarm" report from the UE 106, which is configured to indicate a signal quality that is worse than an absolute threshold, but still within acceptable limits. In another example, the eNodeB 110 receives an Event A2 "floor" report from the UE 106, which is configured to indicate a signal quality worse than an absolute threshold (i.e., a signal floor) and no longer sufficient for service. Upon receipt (step 302) of the report, the eNodeB 110 determines (step 304) whether the UE 106 is dormant. If the UE 106 is not dormant, the eNodeB 110 configures (step 306) the UE 106 for one or more additional reports, such as Event A3 and/or Event A5 reports.

If the UE 106 is dormant, the eNodeB 110 determines (step 308) if the load of the source cell is over the threshold, similarly to step 208, FIG. 2. If the source cell has sufficient load capacity, the eNodeB 110 configures (step 306) the additional events or messages for the UE 106. If the source cell is overloaded, the eNodeB 110 ignores (step 310) the "coverage alarm" report, similarly to step 210, FIG. 2, and releases the UE 106 for the "floor" report. However in this example, if the eNodeB 110 performs a release, it performs a release with redirection towards the target cell, as will be appreciated by those skilled in the art.

Figure 4:
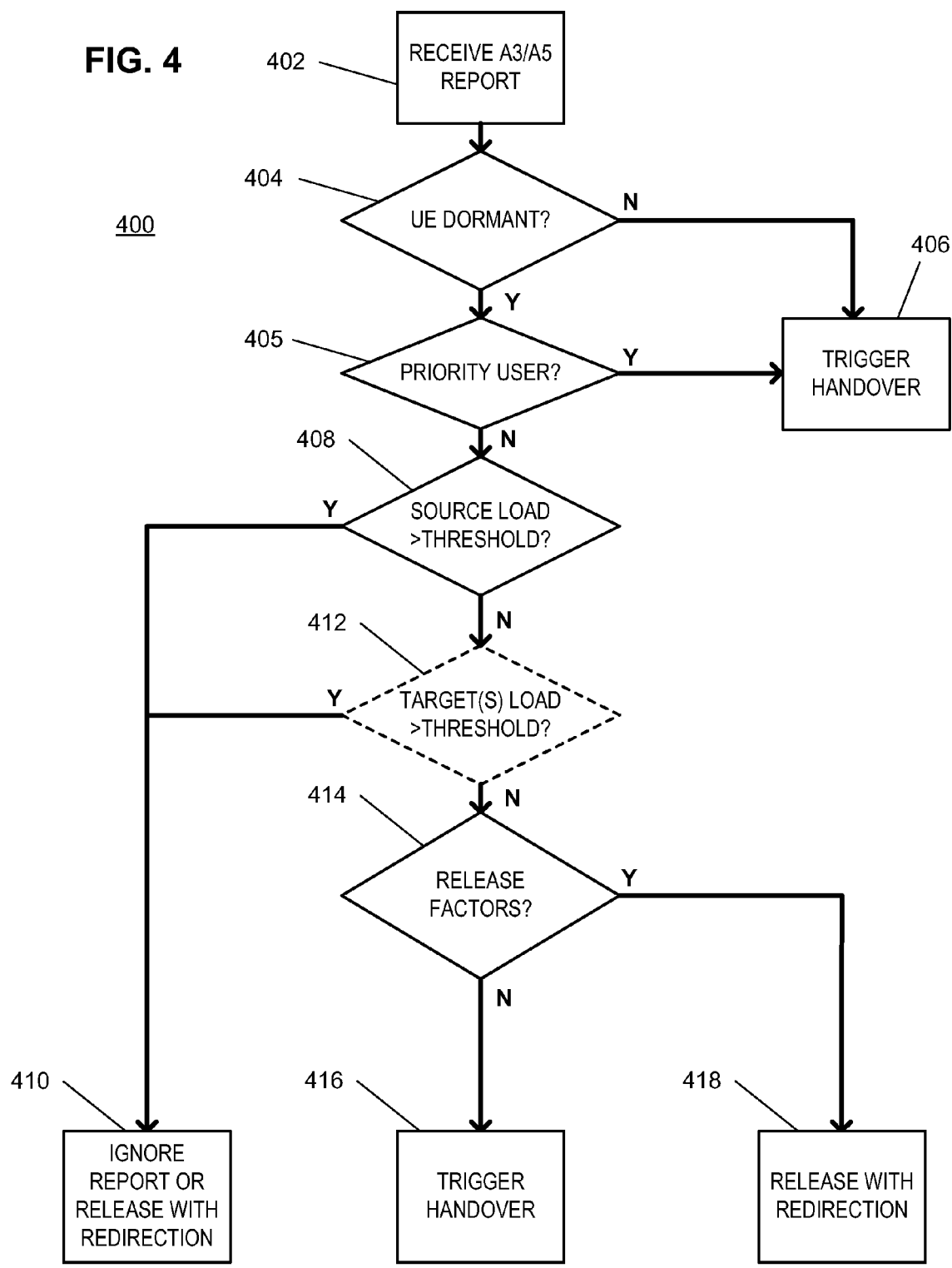
FIG. 4 is a representation of a logic flow for receipt of an A3 or A5 report after the logic flow of FIG. 3.

Turning to FIG. 4, and referring to FIGS. 2 and 3, a logic flow 400 illustrates steps performed by the eNodeB 110 upon receipt of an inter-frequency measurement report, for example, the Event A3 and/or Event A5 reports configured in step 306. At step 402, the eNodeB 110 receives the A3 or A5 report. Steps 404, 405, 406, 408, 412, 414, and 416 are analogous to their respective counterparts in FIG. 2. Steps 410 and 418 are similar to 310 and 318, but if the eNodeB 110 performs a release, it performs a release with redirection towards the target cell, as will be appreciated by those skilled in the art.

Figure 5:
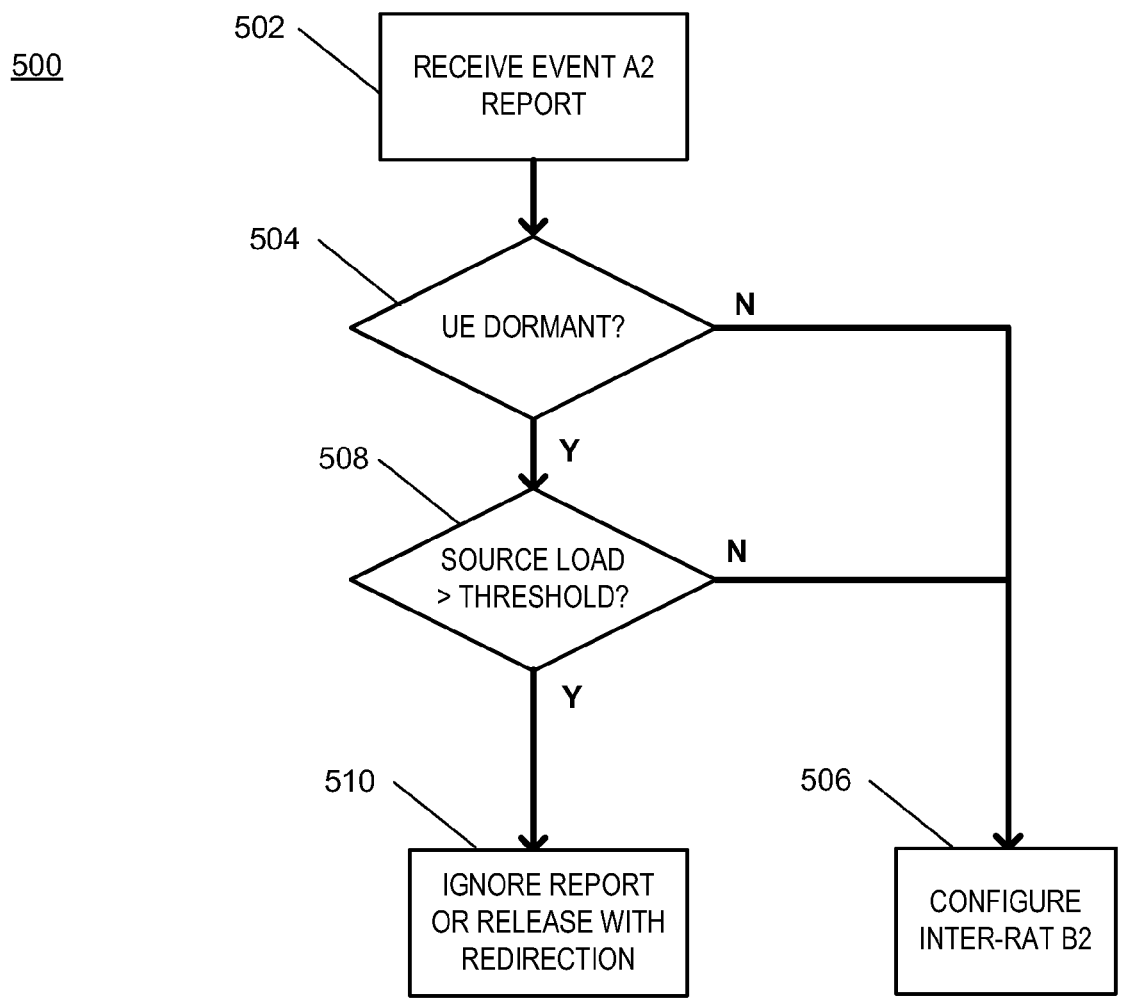
FIG. 5 is a representation of a logic flow for a source eNodeB illustrating receipt of a coverage alarm report for an inter-RAT handover in the system of FIG. 1.

Turning to FIG. 5, and referring to FIG. 3, a logic flow 500 illustrates steps performed by the eNodeB 110 upon receipt of an inter-RAT measurement report. The inter-RAT measurement report may be received when the UE 106 comes within coverage range of the external network 104 and thus a handover from LTE-to-CDMA, LTE-to-UMTS, LTE-to-GSM, or to another wireless network may occur. In general, an inter-RAT handover would occur near border regions of the LTE communication network 102, adjacent to a 2G or 3G wireless network.

In one example, the eNodeB 110 receives (step 502) an Event A2 "coverage alarm" report from the UE 106. Steps 504, 508, and 510 are analogous to their respective counterparts in FIG. 3. Step 506 is similar to step 306, but the eNodeB 110 configures an Event B2 instead of the Event A3 or A5, as will be appreciated by those skilled in the art.

Figure 6:
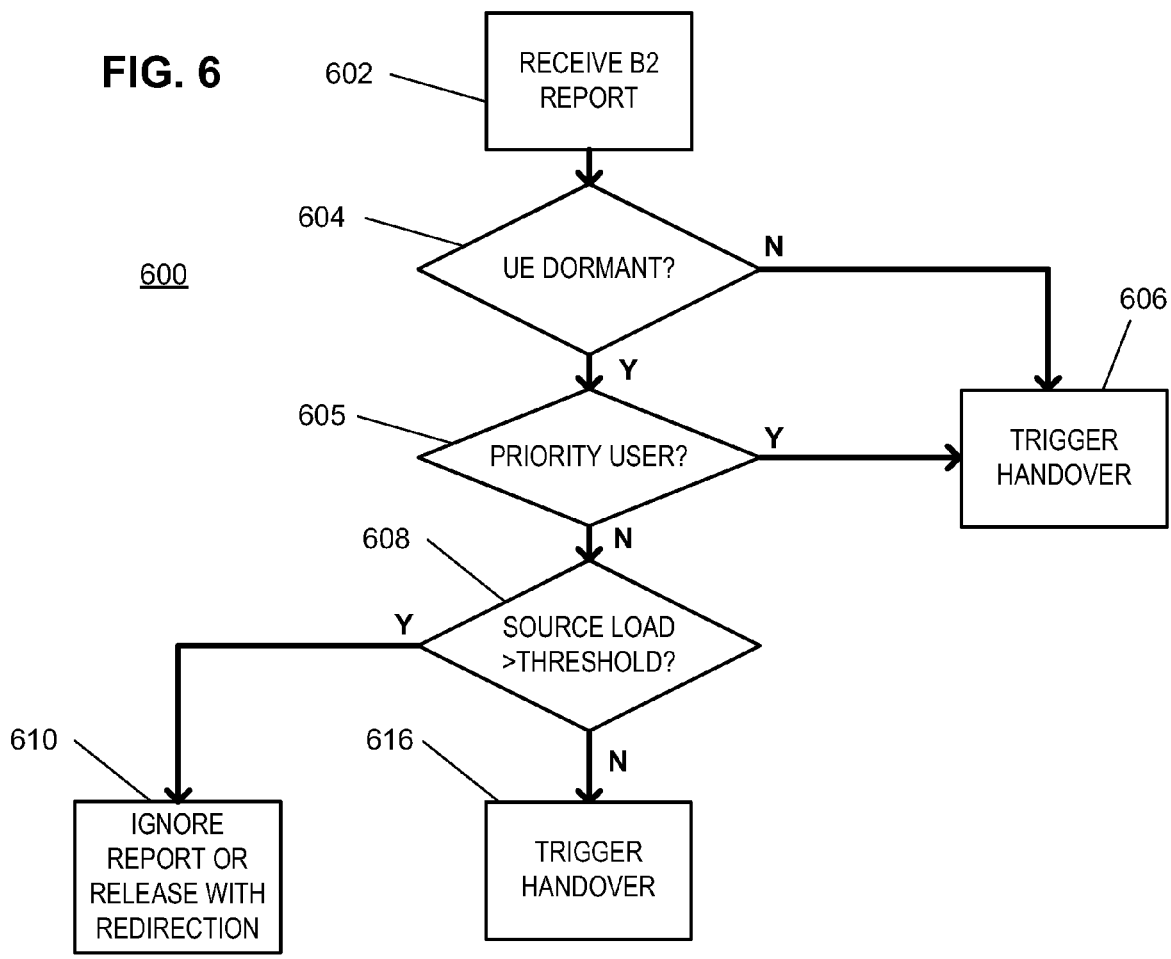
FIG. 6 is a representation of a logic flow for a source eNodeB illustrating receipt of a B2 report after the logic flow of FIG. 5.

Turning to FIG. 6, a logic flow 600 illustrates steps performed by the eNodeB 110 upon receipt of the Event B2 report configured in step 506. Steps 604, 605, 606, 608, 610, and 616 are analogous to their respective counterparts in FIG. 4. In this example, the eNodeB 110 does not have information about the load of the target cell because it is in the external network 104, thus the target cell load determination is omitted.

Figure 7:
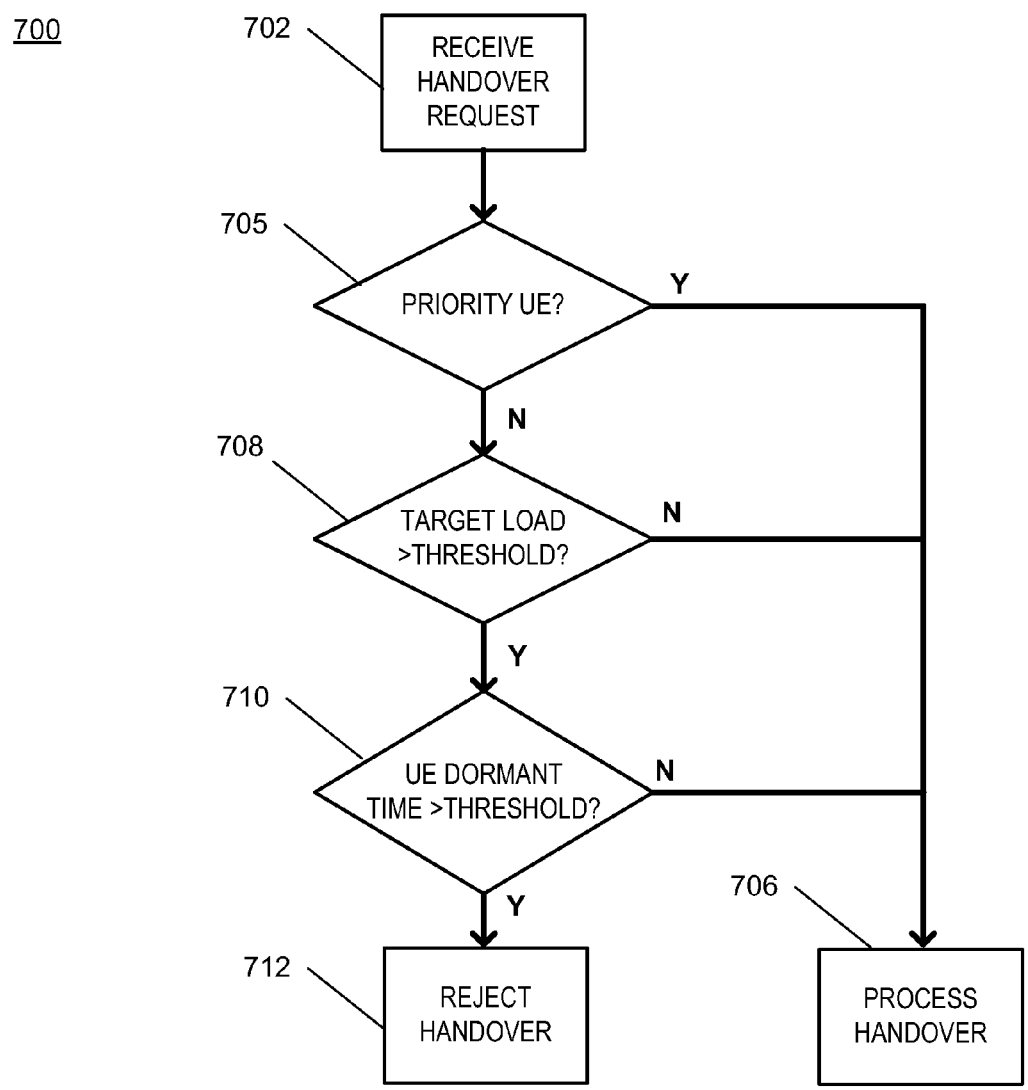
FIG. 7 is a representation of another logic flow for a target eNodeB illustrating receipt of a handover request for an intra-frequency handover in the system of FIG. 1.

Turning to FIG. 7, a logic flow 700 illustrates steps performed by the target eNodeB for a handover from the eNodeB 110, for example, the eNodeB 108. At step 702, the eNodeB 108 receives the handover request from the source eNodeB 110. The eNodeB 108 determines (step 705) whether the UE 106 is a priority user, as described above in step 205. If the UE 106 is a priority user, the eNodeB 108 processes the handover request (step 706).

The eNodeB 108 then compares (step 708) its own load level with a predetermined load threshold. The load level may be based on the one or more factors described above with reference to step 208. If not overloaded, the eNodeB 108 processes the handover (step 706). If the eNodeB 108 is in overload, it then compares (step 710) the inactivity time of the UE 106 with a predetermined inactivity threshold, for example, between three to ten seconds. The inactivity time is received with the handover request, as will be appreciated by those skilled in the art. The predetermined threshold may be provisioned by the service provider generally for the E-UTRAN or specific to each eNodeB. Additionally, the predetermined threshold may be dynamically determined based on load conditions. If the UE 106 inactivity time is longer than the threshold, the eNodeB 108 rejects the handover (step 712). The eNodeB 108 processes (step 706) the handover if the inactivity time is less than the threshold.

Figure 8:
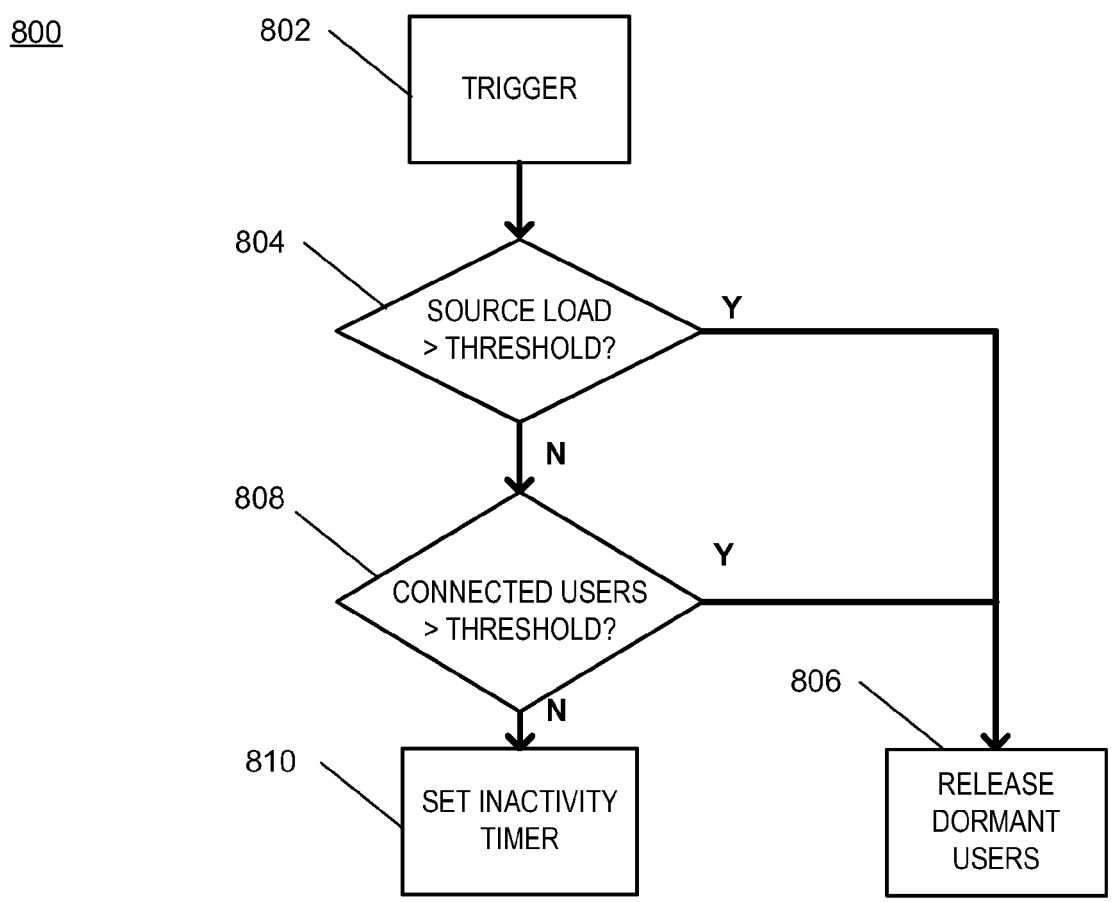
FIG. 8 is a representation of a logic flow for a source eNodeB illustrating a process to keep a number of UEs in an idle or dormant state.

Turning to FIG. 8, a source eNodeB in one example performs logic flow 800 in order to keep connected UEs in the connected state, instead of putting the UEs in an idle state after a predetermined inactivity time. As described above, this may reduce the signaling overhead of transitioning the UEs between idle and connected states. The logic flow 800 in one example is performed by a source eNodeB upon receipt of a connection request from a UE. For example, the UE 106, while in a disconnected state, sends an RRC request to the eNodeB 110 to obtain resources for data transmission. Alternatively, the eNodeB may perform the logic flow 800 upon another trigger, such as expiration of a timer or occurrence of an overload event.

Upon the trigger (step 802), the eNodeB 110 in one example compares (step 804) its current load with a predetermined threshold, as described above. If the eNodeB 110 is in an overload condition, the eNodeB 110 releases (step 806) one or more dormant UEs. The eNodeB may select UEs for release based on their priority status, inactivity time, or other factors. For example, the eNodeB 110 in one example does not release a priority user and releases only those UEs that have been inactive for thirty seconds or longer.

If the eNodeB 110 is not in the overload condition, the eNodeB 110 compares (step 808) a number of currently connected UEs to a predetermined connected user threshold (RRC_CONNECTED). If the connected user threshold has been reached (e.g., a maximum number of connected UEs), the eNodeB 110 may release (step 806) dormant UEs. If the maximum number has not been reached, the eNodeB 110 in one example increases (step 810) the inactivity time of one or more connected UEs.

The eNodeB 110 in one example selects the UEs that will receive an increased inactivity time based on factors such as the device type of the UE, user priority for the UE, RF signal strength of the UE, or handover frequency/history. Additional factors will be apparent to those skilled in the art. For example, the eNodeB 110 may select only those UEs with a sufficiently high RF signal and a number of recent handovers below a threshold.

For those selected UEs that receive an increased inactivity timer, the eNodeB 110 in one example selects the increased inactivity time. For example, if a default inactivity time is ten seconds, after which the UE would ordinarily be transitioned to the idle state, the eNodeB 110 may increase the inactivity time to thirty seconds, several minutes, or higher values. In a further example, the eNodeB 110 dynamically selects the new inactivity time, as described above, based on one or more factors such as device type, network load, or user priority. Inactivity times may be selected for an individual UE, a group of UEs, or applied to all UEs in the coverage area.

Based on field observations (3G and 4G), the majority of the handover events are triggered by approximately 10% of users. These users are typically in the edge of the cell coverage area, so the key is to properly manage these handover events. It is estimated that approximately 85% of the connected users would generate minimal signaling traffic (e.g., 1-2 SR/S1Release, 1-2 HOs and periodic TAUs). Only the remaining 15% of the connected users would generate the current average signaling load for transitions from idle to connected state, and with the proposed methods for HO reduction, reduce the HO rates to current (or lower) average rates (e.g., less than 15 handovers per attach UE per hour).

The apparatus 100 in one example comprises a plurality of components such as one or more of electronic components, hardware components, and computer software components. A number of such components can be combined or divided in the apparatus 100. An example component of the apparatus 100 employs and/or comprises a set and/or series of computer instructions written in or implemented with any of a number of programming languages, as will be appreciated by those skilled in the art.

The apparatus 100 in one example employs one or more computer-readable non-transitory media. The computer-readable non-transitory media store software, firmware and/or assembly language for performing one or more portions of one or more implementations of the invention. Examples of a computer-readable non-transitory medium for the apparatus 100 comprise the recordable data storage medium 118 of the eNodeBs 108 and 110. The computer-readable non-transitory medium for the apparatus 100 in one example comprise one or more of a magnetic, electrical, optical, biological, and atomic data storage medium. For example, the computer-readable non-transitory medium comprise floppy disks, magnetic tapes, CD-ROMs, DVD-ROMs, hard disk drives, and electronic memory.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the steps of:
   receiving a measurement report for a handover, at a source evolved Node B (eNodeB) of a Long Term Evolution (LTE) communication network, from a user equipment (UE) served by the source eNodeB;
   determining if the UE is dormant;
   determining if a current load level for the handover is over a threshold;
   discarding the measurement report if the current load level is over the threshold and the UE is dormant; and
   triggering the handover based on the measurement report if the current load level is not over the threshold or the UE is not dormant.

2. The method of claim 1, wherein the UE is dormant if it has not transferred uplink (UL) or downlink (DL) user data within a predetermined inactivity time.

3. The method of claim 1, wherein the UE is currently in a Medium Access Control Discontinuous Reception (MAC-DRX) cycle.

4. The method of claim 1, further comprising the step of:
   increasing a release inactivity timer for the UE, wherein the source eNodeB is configured to release the UE if the UE does not transfer UL or DL user data for the duration of the release inactivity timer.

5. The method of claim 4, wherein the step of increasing the release inactivity timer comprises the step of:
   dynamically adjusting the release inactivity timer based on the current load level.

6. The method of claim 1, wherein the step of determining if the current load level for the handover is over the threshold comprises the step of:
   determining if a load level of the source eNodeB is over a source threshold.

7. The method of claim 1, wherein the step of determining if the current load level for the handover is over the threshold comprises the step of:
   determining if a load level of a target eNodeB for the handover is over a target threshold.

8. The method of claim 7, wherein the target eNodeB comprises a first target eNodeB, wherein the step of determining if the load level of the target eNodeB for the handover is over the target threshold comprises the step of:
   determining if a load level of a second target eNodeB for the handover is over a second target threshold.

9. The method of claim 1, wherein the step of discarding the measurement report comprises the step of:
   releasing the UE if an Event A2 measurement has not been configured for the UE.

10. The method of claim 1, wherein the step of discarding the measurement report comprises the step of:
    releasing the UE after a predetermined number of previously received measurement reports have been discarded.

11. The method of claim 10, wherein the step of releasing the UE comprises the step of:
releasing the UE with redirection for an inter-frequency measurement report or an inter-radio access technology (inter-RAT) measurement report.

12. The method of claim 1, further comprising the steps of:
releasing the UE if a handover rate of the UE is over a rate threshold; and
releasing the UE if the UE has exceeded a release inactivity timer.

13. The method of claim 1, wherein the step of receiving the measurement report comprises the steps of:
receiving an Event A2 measurement report for an inter-frequency handover or an inter-RAT handover;
discarding the Event A2 measurement report if the Event A2 measurement report indicates a coverage alarm; and
releasing the UE with redirection if the Event A2 measurement report indicates a signal floor.

14. The method of claim 1, wherein the step of triggering the handover comprises the step of:
sending a handover request with a handover rate or handover history of the UE to a target eNodeB.

15. The method of claim 1, further comprising the step of:
triggering the handover if the UE is a priority user.

16. A method, comprising the steps of:
receiving a request for a handover of a UE from a source eNodeB of an LTE communication network;
determining if a current load level for the handover is over a load threshold;
accepting the request if the current load level is not over the load threshold;
determining if an inactivity time for the UE is over a predetermined inactivity threshold; and
rejecting the handover if the inactivity time is over the predetermined inactivity threshold.

17. The method of claim 16, further comprising the step of:
accepting the request if the UE is a priority user.

18. An evolved Node B (eNodeB) in a Long Term Evolution (LTE) communication network, said eNodeB operatively coupled to one or more user equipment (UE), eNodeB configured to perform steps comprising:
receiving a measurement report for a handover, from a user equipment (UE) served by the eNodeB;
determining if the UE is dormant;
determining if a current load level for the handover is over a threshold;
discarding the measurement report if the current load level is over the threshold and the UE is dormant; and
triggering the handover based on the measurement report if the current load level is not over the threshold or the UE is not dormant.

19. The eNodeB of claim 18, further configured to perform steps comprising:
releasing the UE if a handover rate of the UE is over a rate threshold; and
releasing the UE if the UE has exceeded a release inactivity timer.

20. The eNodeB of claim 18, wherein the step of receiving the measurement report comprises the steps of:
receiving an Event A2 measurement report for an inter-frequency handover or an inter-RAT handover;
discarding the Event A2 measurement report if the Event A2 measurement report indicates a coverage alarm; and
releasing the UE with redirection if the Event A2 measurement report indicates a signal floor; and
the step of triggering the handover further comprises the step of sending a handover request with a handover rate or handover history of the UE to a target eNodeB.

\* \* \* \* \*